United States Patent
Kim

(10) Patent No.: US 9,249,854 B2
(45) Date of Patent: Feb. 2, 2016

(54) PISTON VALVE ASSEMBLY FOR SHOCK ABSORBER

(71) Applicant: MANDO CORPORATION, Pyeongtaek-Si, Gyeonggi-do (KR)

(72) Inventor: Tae Ju Kim, Yongin-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/307,649

(22) Filed: Jun. 18, 2014

(65) Prior Publication Data

US 2015/0114774 A1 Apr. 30, 2015

(30) Foreign Application Priority Data

Oct. 28, 2013 (KR) .......................... 10-2013-0128520

(51) Int. Cl.
*F16F 9/34* (2006.01)
*F16F 9/348* (2006.01)
*F16F 9/512* (2006.01)
*F16F 9/46* (2006.01)
*F16F 9/32* (2006.01)

(52) U.S. Cl.
CPC .............. *F16F 9/3482* (2013.01); *F16F 9/348* (2013.01); *F16F 9/3485* (2013.01); *F16F 9/5126* (2013.01); *F16F 9/3214* (2013.01); *F16F 9/3405* (2013.01); *F16F 9/466* (2013.01)

(58) Field of Classification Search
CPC ....... F16F 9/3482; F16F 9/348; F16F 9/5126; F16F 9/3485; F16F 9/3214; F16F 9/466; F16F 9/3405

USPC ................................. 188/317, 322.13, 322.15
See application file for complete search history.

(56) References Cited

U.S. PATENT DOCUMENTS

| | | | | |
|---|---|---|---|---|
| 4,953,671 A * | 9/1990 | Imaizumi | .................... | 188/282.3 |
| 5,129,488 A * | 7/1992 | Furuya et al. | .............. | 188/282.6 |
| 5,386,892 A * | 2/1995 | Ashiba | ......................... | 188/282.8 |
| 6,860,370 B2 * | 3/2005 | Nakadate | ..................... | 188/282.5 |
| 8,302,746 B2 * | 11/2012 | Azekatsu | .................. | 188/322.15 |
| 8,544,619 B2 * | 10/2013 | Yamaguchi et al. | .......... | 188/285 |
| 8,978,845 B2 * | 3/2015 | Kim | .............................. | 188/275 |
| 2005/0045440 A1 * | 3/2005 | Kock et al. | ............... | 188/322.15 |
| 2013/0333993 A1 * | 12/2013 | Yu | ............................... | 188/322.22 |
| 2014/0231199 A1 * | 8/2014 | Kim et al. | ..................... | 188/313 |
| 2015/0027829 A1 * | 1/2015 | Nowaczyk et al. | ........... | 188/313 |
| 2015/0041269 A1 * | 2/2015 | Lim | .......................... | 188/322.15 |

* cited by examiner

*Primary Examiner* — Thomas Irvin

(74) *Attorney, Agent, or Firm* — McDermott Will & Emery LLP

(57) ABSTRACT

A piston valve assembly for a shock absorber is disclosed. In a high-frequency mode, a damping force control is achieved through an open passage that is always opened. In a low-frequency mode, a guide assembly moves downward due to an increase in a pressure of a first pressure chamber by a fluid moved through an inlet hole of the first pressure chamber. At this time, the guide assembly blocks the open passage and the damping force control is achieved through only a rebound passage. Consequently, it is possible to solve a fluid bottle neck through a passage formation. A disk is installed on the inlet hole to prevent a continuous increase in the pressure of the first pressure chamber, thereby effectively preventing the reduction of the damping force.

7 Claims, 4 Drawing Sheets

PISTON VALVE ASSEMBLY FOR SHOCK ABSORBER

CROSS-REFERENCE(S) TO RELATED APPLICATION

This application claims priority of Korean Patent Application No. 10-2013-0128520, filed on Oct. 28, 2013, in the Korean Intellectual Property Office, the contents of which are incorporated herein by reference in its entirety.

BACKGROUND OF THE INVENTION

1. Field of the Invention

The present invention relates to a piston valve assembly for a shock absorber, which is capable of improving a ride comfort by providing a damping force sensitive to both a pressure and a frequency, and more particularly, to a piston valve assembly for a shock absorber, in which an inlet hole is formed in an upper end of a first pressure chamber and a disk is installed on the inlet hole, such that the inlet hole is closed so as to prevent a pressure of the first pressure chamber from being continuously increased.

2. Description of the Related Art

Generally, suspension systems are installed in vehicles so as to improve a ride comfort by absorbing and damping a vibration or shock which is transferred from a road surface to an axle during driving. As one of such suspension systems, a shock absorber is used.

The shock absorber operates with a vibration of a vehicle according to a condition of a road surface. At this time, a damping force generated by the shock absorber is changed according to an operating speed of the shock absorber, that is, a high or low operating speed of the shock absorber.

A ride comfort and a driving stability of a vehicle may be controlled according to how to adjust a damping force characteristic generated by the shock absorber. Therefore, in designing the vehicle, it is very important to adjust the damping force characteristic of the shock absorber.

In this regard, an existing frequency-sensitive shock absorber or an existing pressure-sensitive shock absorber has a valve structure that realizes similar operational effects in terms of functions. However, parts for pressure sensitivity and parts for frequency sensitivity must be separately provided. Consequently, an increase in the number of parts and a rise in production cost are inevitable.

In particular, since such a problem causes an additional problem that the total length of the piston valve assembly is increased, there are many limitations to applying the conventional piston valve assembly to small- and medium-sized vehicles.

CITATION LIST

Patent Literature (Patent Literature 1) Korean Patent Application No. 10-2005-0106961
(Patent Literature 2) Korean Patent Application No. 10-2011-0087171

SUMMARY OF THE INVENTION

The present invention has been made in an effort to solve the above problems and is directed to a piston valve assembly for a shock absorber, which is capable of solving a fluid bottle neck through a passage formation. Specifically, in a high-frequency mode, a damping force control is achieved through an open passage that is always opened, and in a low-frequency mode, a guide assembly moves downward due to an increase in a pressure of a first pressure chamber by a fluid moved through an inlet hole of the first pressure chamber. At this time, the guide assembly blocks the open passage and the damping force control is achieved through only a rebound passage. In addition, a disk is installed on the inlet hole to prevent a continuous increase in the pressure of the first pressure chamber, thereby effectively preventing the reduction of the damping force.

According to the present invention, a piston valve assembly for a shock absorber includes: a piston rod reciprocating within a cylinder; a main piston mounted on the piston rod to partition the cylinder into upper and lower chambers, wherein a plurality of compression passages and a plurality of rebound passages pass through the main piston in a vertical direction; a pressure valve mounted on the piston rod and disposed below the main piston, wherein a first pressure chamber having a ring shape around the piston rod is formed in a bottom surface of the pressure valve and an inlet hole is formed in an upper portion of the first pressure chamber; a disk installed on the inlet hole so as to prevent a continuous increase in a pressure of the first pressure chamber; a lower retainer mounted on the piston rod and disposed below the pressure valve, wherein a top surface of the lower retainer is opened; a plurality of bypass passages formed on an outer periphery of the piston rod from an upper side of the main piston to an upper side of the lower retainer along a vertical length direction; a guide assembly mounted on the piston rod and disposed between the pressure valve and the lower retainer to surround an outer periphery of the pressure valve and a bottom surface of the pressure valve, wherein the guide assembly tightly contacts the bottom surface of the pressure valve in a high-frequency mode and moves down toward the lower retainer in a low-frequency mode; and a lower disk assembly mounted on the piston rod and disposed between the guide assembly and the lower retainer, wherein the lower disk assembly forms a second pressure chamber in the lower retainer while covering the opened top surface of the lower retainer, forms an open passage communicating the second pressure chamber with the lower chamber in the high-frequency mode, and blocks the communication between the second pressure chamber and the lower chamber in the low-frequency mode due to the downward movement of the guide assembly.

The disk may be installed in the piston rod, with a spacer being disposed therebetween.

The piston valve assembly for the shock absorber may further include: a first orifice formed on the bottom surface of the pressure valve to communicate the bypass passage with the first pressure chamber; and a second orifice formed in a central portion of the lower retainer to communicate the bypass passage with the second pressure chamber.

In a rebound stroke, when the pressure of the first pressure chamber is increased by a fluid introduced through the inlet hole in a low-frequency mode, the guide assembly may move downward due to the increased pressure to block the first orifice and the open passage and generate a damping force only in the rebound passage. In the high-frequency mode, a damping force may be generated in only the open passage that is opened.

The guide assembly may include: a first disk having a center through which the piston rod passes, an inner edge contacting a first seat portion formed around the piston rod along an inner edge of the first pressure chamber of the pressure valve, and an outer edge tightly contacting an outside of an outer edge of the first pressure chamber, wherein the first disk is elastically deformed according to an amount of a compressed fluid introduced from the bypass passage to the first pressure chamber through the first orifice that is formed in the first seat portion to communicate with the first pressure chamber; a second disk having a center through which the piston rod passes, wherein the second disk has the same shape as the first disk and is disposed to be spaced apart below the first disk, and interlocks with the elastic deformation of the first disk; a first spacer having a center through which the piston rod passes, wherein the first spacer is mounted between the first disk and the second disk such that the first and second disk are spaced apart from each other by a predetermined distance; a second spacer having a center through which the piston rod passes, wherein the second spacer is mounted between the second disk and the lower disk assembly such that the second disk and the lower disk assembly are spaced apart from each other by a predetermined distance; a ring-shaped ring support piece having a thickness corresponding to the first spacer and having an inner edge fixed between outer edges of the first and second disks; a guide wall extending along an outer edge of the ring support piece and facing an outer periphery of the pressure valve; and an O-ring fitted into a ring-shaped mounting groove recessed along an outer periphery of the pressure valve and tightly supported to an inner periphery of the guide wall.

The lower retainer may further include: a first seat portion provided around the piston rod and having a ring shape protruding to be stepped from a center of the lower retainer; and a second seat portion having a ring shape protruding to be stepped from an outer edge of the lower retainer. The second pressure chamber communicating with the bypass passage may be formed between a bottom outer edge of the lower disk assembly and the first and second seat portions.

DETAILED DESCRIPTION OF EXEMPLARY EMBODIMENTS

Hereinafter, a piston valve assembly for a shock absorber according to a preferred embodiment of the present invention will be described in detail with reference to the accompanying drawings.

Figure 1:
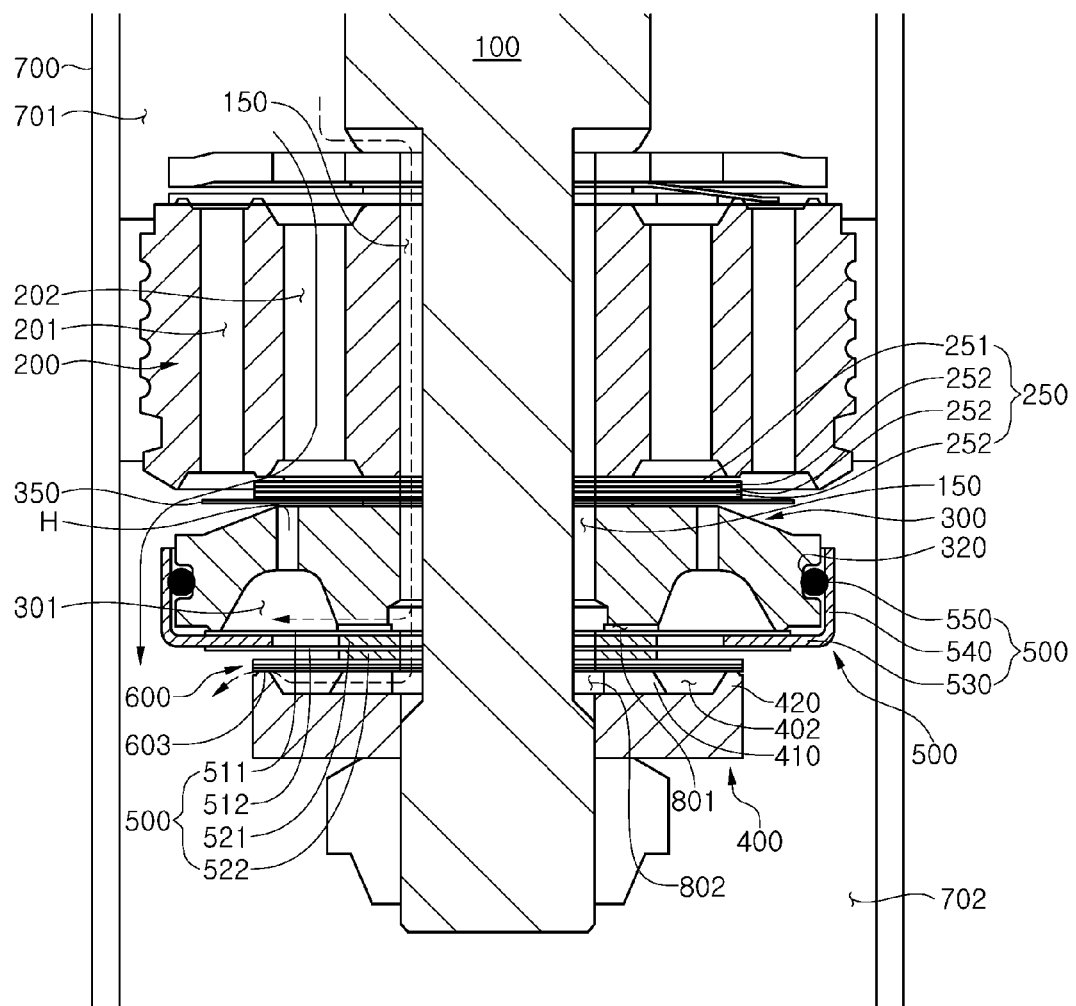
FIG. 1 is a cross-sectional conceptual diagram illustrating an overall structure of a piston valve assembly for a shock absorber according to a preferred embodiment of the present invention.
Figure 2:
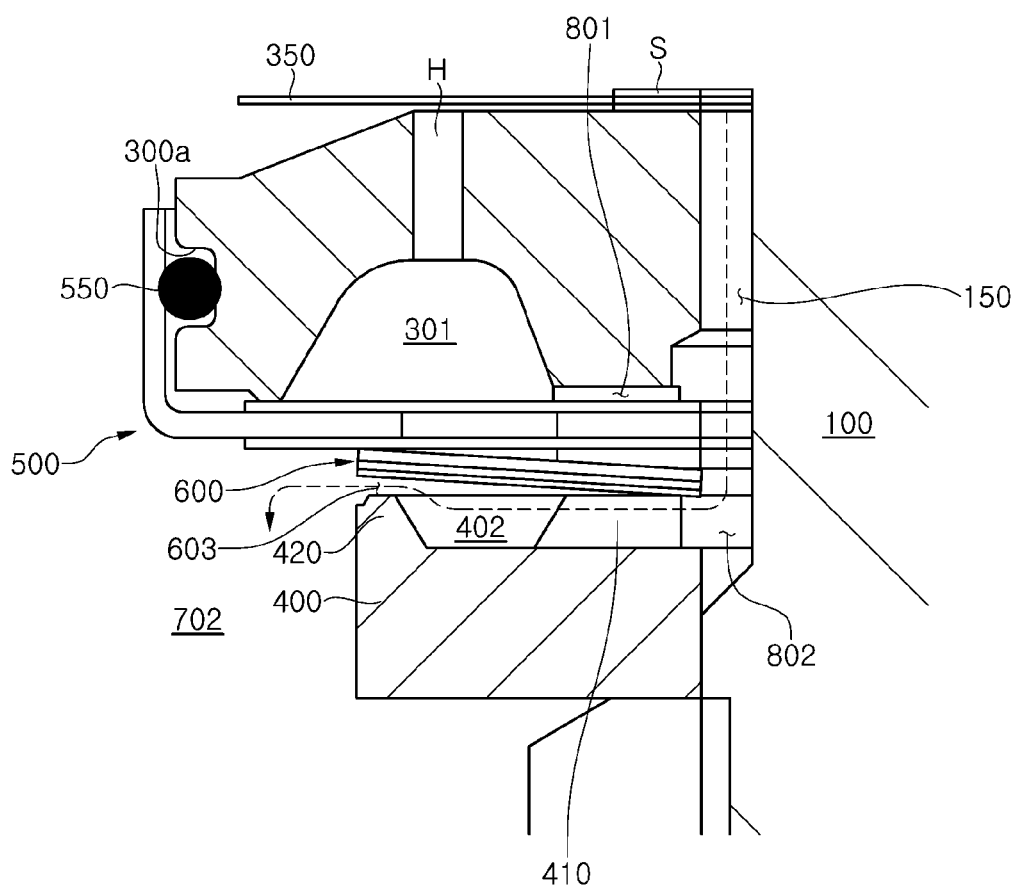
FIGS. 2 and 3 are cross-sectional conceptual diagrams illustrating operations depending on a frequency and a pressure in the piston valve assembly for the shock absorber according to the preferred embodiment of the present invention.
Figure 3:
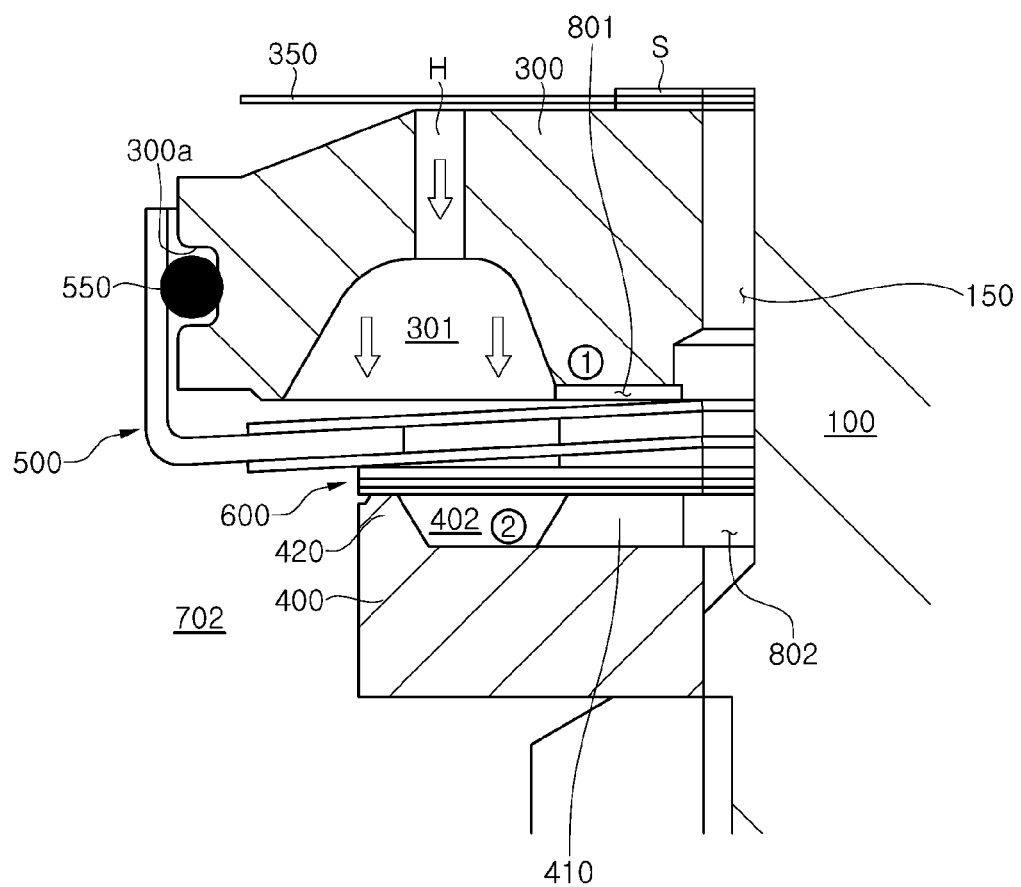
Figure 4:
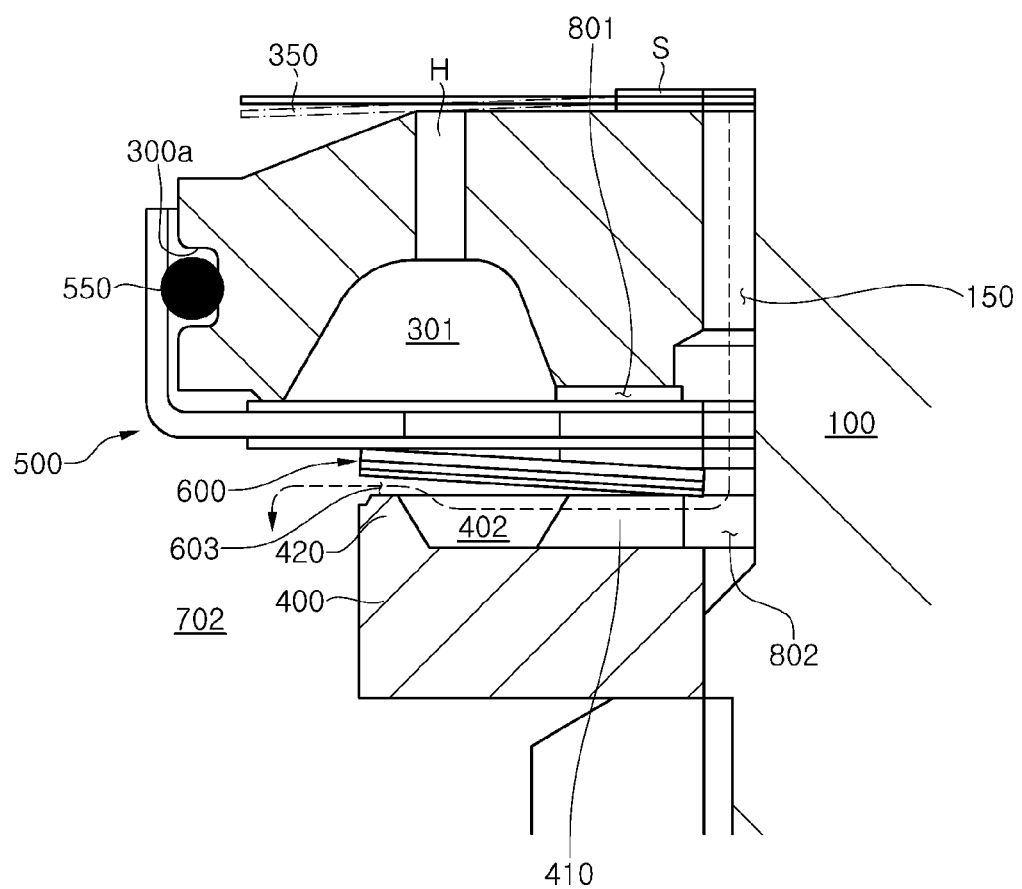
FIG. 4 is a diagram describing an operation of a disk installed on an inlet hole.

FIG. 1 is a cross-sectional conceptual diagram illustrating an overall structure of a piston valve assembly for a shock absorber according to a preferred embodiment of the present invention, and FIGS. 2 and 3 are cross-sectional conceptual diagrams illustrating operations depending on a frequency and a pressure in the piston valve assembly for the shock absorber according to the preferred embodiment of the present invention. FIG. 4 is a diagram describing an operation of a disk installed on an inlet hole.

Referring to FIGS. 1 to 3, the piston valve assembly for the shock absorber according to the preferred embodiment of the present invention includes a piston rod 100 which reciprocates within a cylinder 700.

A main piston 200 is installed in the piston rod 100. A plurality of compression passages 201 and a plurality of rebound passages 202 pass through the main piston 200 in a vertical direction. The main piston 200 partitions the cylinder 700 into an upper chamber 701 and a lower chamber 702.

A pressure valve 300 is mounted on the piston rod 100. The pressure valve 300 is disposed below the main piston 200. A first pressure chamber 301 having a ring shape around the piston rod 100 is formed in a bottom surface of the pressure valve 300, and an inlet hole H is formed in an upper portion of the first pressure chamber 301. The first pressure chamber 301 and the inlet hole H communicate with each other.

A disk 350 is installed on the inlet hole H so as to prevent a continuous increase in the pressure of the first pressure chamber 301. The disk 350 is installed in the piston rod 100, with a spacer S being disposed therebetween.

Referring to FIG. 4, a damping force may be reduced when the fluid is continuously introduced into the first pressure chamber 301 during a rebound stroke and thus the pressure of the first pressure chamber 301 is increased. The disk 350 closes the inlet hole H to effectively prevent the damping force from being reduced.

A lower retainer 400 having an opened top surface is mounted on the piston rod 100. The lower retainer 400 is disposed below the pressure valve 300.

A plurality of bypass passages 150 are formed on an outer periphery of the piston rod 100 from an upper side of the main piston 200 to an upper side of the lower retainer 400 along a vertical length direction.

A guide assembly 500 is mounted on the piston rod 100. The guide assembly 500 is disposed between the pressure valve 300 and the lower retainer 400 to surround an outer periphery of the pressure valve 300 and the bottom surface of the pressure valve 300. The guide assembly 500 tightly contacts the bottom surface of the pressure valve 300 in a high-frequency mode and moves down toward the lower retainer 400 in a low-frequency mode.

A lower disk assembly 600 is mounted on the piston rod 100.

The lower disk assembly 600 is disposed between the guide assembly 500 and the lower retainer 400.

The lower disk assembly 600 covers the opened top surface of the lower retainer 400 to form a second pressure chamber 402 in the lower retainer 400. In the high-frequency mode, the lower disk assembly 600 forms an open passage 603 to communicate the second pressure chamber 402 with the lower chamber 702, and in the low-frequency mode, the lower disk assembly 600 blocks the communication of the second pressure chamber 402 with the lower chamber 702 by the downward movement of the guide assembly 500.

A first orifice 801 is formed on the bottom surface of the pressure valve 300 to communicate the bypass passage 150 with the first pressure chamber 301.

A second orifice 802 is formed in the central portion of the lower retainer 400 to communicate the bypass passage 150 with the second pressure chamber 402.

In the high-frequency mode, a damping force is generated in the open passage 603.

In the low-frequency mode, when the pressure of the first pressure chamber 301 is increased by the fluid introduced through the inlet hole H of the first pressure chamber 301, the guide assembly 500 is moved down by the increased pressure to block the first orifice 801 and the open passage 603 and generate the damping force only in the rebound passage 202.

A passage cross-sectional area of the second orifice 802 may be larger than a passage cross-sectional area of the first orifice 801.

The guide assembly 500 includes a first disk 511. The piston rod 100 passes through the center of the first disk 511.

An inner edge of the first disk 511 contacts a first seat portion 410 formed around the piston rod 100 along an inner edge of the first pressure chamber 301 of the pressure valve 300, and an outer edge of the first disk 511 tightly contacts an outside of an outer edge of the first pressure chamber 301.

The first disk 511 is elastically deformed according to an amount of a compressed fluid introduced from the bypass passage 150 to the first pressure chamber 301 through the first orifice 801 that is formed in the first seat portion 410 to communicate with the first pressure chamber 301.

The guide assembly 500 includes a second disk 512. The piston rod 100 passes through the center of the second disk 512. The second disk 512 has the same shape as the first disk 511. The second disk 512 is disposed to be spaced apart below the first disk 511 and interlocks with the elastic deformation of the first disk 511.

The guide assembly 500 includes a first spacer 521. The piston rod 100 passes through the center of the first spacer 521.

The first spacer 521 is mounted between the first disk 511 and the second disk 512 and separates the first and second disks 511 and 512 from each other by a predetermined distance.

The guide assembly 500 includes a second spacer 522. The piston rod 100 passes through the center of the second spacer 522.

The second spacer 522 is mounted between the second disk 512 and the lower disk assembly 600 and separates the second disk 512 and the lower disk assembly 600 from each other by a predetermined distance.

The guide assembly 500 includes a ring-shaped ring support piece 530. A ring-shaped ring support piece 530 has a thickness corresponding to the first spacer 521 and has an inner edge fixed between outer edges of the first and second disks 511 and 512.

The guide assembly 500 includes a guide wall 540. The guide wall 540 is installed to extend along an outer edge of the ring support piece 530 and face an outer periphery of the pressure valve 300.

The guide assembly 500 includes an O-ring 550. The O-ring 550 is fitted into a ring-shaped mounting groove 300a recessed along an outer periphery of the pressure valve 530 and is tightly supported to an inner periphery of the guide wall 540.

The lower retainer 400 is disposed around the piston rod 100 and further includes a ring-shaped first seat portion 410 protruding to be stepped from the center of the lower retainer 400, and a ring-shaped second seat portion 420 protruding to be stepped from the outer edge of the lower retainer 400.

The second pressure chamber 402 communicating with the bypass passage 150 is formed between a bottom outer edge of the lower disk assembly 600 and the first and second seat portions 410 and 420.

A volume of the first pressure chamber 301 may be larger than or equal to a volume of the second pressure chamber 402.

The operation of the piston valve assembly for the shock absorber according to the preferred embodiment of the present invention will be described below.

First, in the high-frequency mode in which a small amplitude is maintained, as illustrated in FIG. 2, the compressed fluid introduced through the bypass passage 150 of the piston rod 100 does not flow into the first pressure chamber 301 because an inflow resistance is generated due to a small cross-sectional area of the first orifice 801. Consequently, the increase in the pressure of the first pressure chamber 301 is limited.

Then, the compressed fluid flows into the second pressure chamber 402 through the second orifice 802. When an amount of the inflowing compressed fluid is increased, the lower disk assembly 600 is opened toward the lower chamber 702 through the open passage 603, thus generating the damping force.

On the other hand, in the low-frequency mode in which a large amplitude is maintained, as illustrated in FIG. 3, the compressed fluid flows into the first pressure chamber 301 through the inlet hole H of the first pressure chamber 301. When a sufficient amount of the compressed fluid flows into the first pressure chamber 301, the guide assembly 500 moves downward due to the self-weight of the introduced compressed fluid and the pressure applied in an arrow direction.

Then, the guide assembly 500 moves downward and presses the upper side of the outer edge of the lower disk assembly 600 to thereby implement the damping force in only the rebound passage 202 by blocking the communication between the lower disk assembly 600 and the lower chamber 702.

Referring to FIG. 4, the disk 350 is installed on the inlet hole H so as to prevent a continuous increase in the pressure of the first pressure chamber 301. In the low-frequency mode, the damping force may be reduced when the fluid is continuously introduced into the first pressure chamber 301 during the rebound stroke and thus the pressure of the first pressure chamber 301 is increased. The disk 350 closes the inlet hole H to prevent the continuous increase in the pressure of the first pressure chamber 301 and prevent the reduction of the damping force.

As described above, according to the present invention, in the high-frequency mode, the damping force control is achieved through the open passage that is always opened. In the low-frequency mode, the guide assembly moves downward due to the increase in the pressure of the first pressure chamber by the fluid moved through the inlet hole of the first pressure chamber. At this time, the guide assembly blocks the open passage and the damping force control is achieved through only the rebound passage. Consequently, it is possible to solve a fluid bottle neck through the passage formation.

In addition, according to the present invention, the disk is installed on the inlet hole to prevent the continuous increase in the pressure of the first pressure chamber, thereby effectively preventing the reduction of the damping force.

While the embodiments of the present invention have been described with reference to the specific embodiments, it will be apparent to those skilled in the art that various changes and modifications may be made without departing from the spirit and scope of the invention as defined in the following claims.

| DESCRIPTION OF REFERENCE NUMERALS | |
| --- | --- |
| 100: piston rod | 150: bypass passage |
| 200: main piston | 201: compression passage |
| 202: rebound passage | 300: pressure valve |
| 301: first pressure chamber | 410: first seat portion |
| 350: disk | 400: lower retainer |
| 402: second pressure chamber | 420: second seat portion |
| 500: guide assembly | 511: first disk |
| 512: second disk | 521: first spacer |

DESCRIPTION OF REFERENCE NUMERALS

522: second spacer
540: guide wall
600: lower disk assembly
700: cylinder
801: first orifice
H: inlet hole
530: ring support piece
550: O-ring
603: open passage
701, 702: upper and lower chambers
802: second orifice
S: spacer

What is claimed is:

1. A piston valve assembly for a shock absorber, comprising:
 a piston rod reciprocating within a cylinder;
 a main piston mounted on the piston rod to partition the cylinder into upper and lower chambers, wherein a plurality of compression passages and a plurality of rebound passages pass through the main piston in a vertical direction;
 a pressure valve mounted on the piston rod and disposed below the main piston, wherein a first pressure chamber having a ring shape around the piston rod is formed in a bottom surface of the pressure valve and an inlet hole is formed in an upper portion of the first pressure chamber;
 a disk installed on the inlet hole so as to prevent a continuous increase in a pressure of the first pressure chamber;
 a lower retainer mounted on the piston rod and disposed below the pressure valve, wherein a top surface of the lower retainer is opened;
 a plurality of bypass passages formed on an outer periphery of the piston rod from an upper side of the main piston to an upper side of the lower retainer along a vertical length direction;
 a guide assembly mounted on the piston rod and disposed between the pressure valve and the lower retainer to surround an outer periphery of the pressure valve and a bottom surface of the pressure valve, wherein the guide assembly tightly contacts the bottom surface of the pressure valve in a high-frequency mode and moves down toward the lower retainer in a low-frequency mode; and
 a lower disk assembly mounted on the piston rod and disposed between the guide assembly and the lower retainer, wherein the lower disk assembly forms a second pressure chamber in the lower retainer while covering the opened top surface of the lower retainer, forms an open passage communicating the second pressure chamber with the lower chamber in the high-frequency mode, and blocks the communication between the second pressure chamber and the lower chamber in the low-frequency mode due to the downward movement of the guide assembly.

2. The piston valve assembly for the shock absorber according to claim 1, wherein the disk is installed in the piston rod, with a spacer being disposed therebetween.

3. The piston valve assembly for the shock absorber according to claim 1, further comprising:
 a first orifice formed on the bottom surface of the pressure valve to communicate the bypass passage with the first pressure chamber; and
 a second orifice formed in a central portion of the lower retainer to communicate the bypass passage with the second pressure chamber.

4. The piston valve assembly for the shock absorber according to claim 3, wherein
 in a rebound stroke, when the pressure of the first pressure chamber is increased by a fluid introduced through the inlet hole in a low-frequency mode, the guide assembly moves downward due to the increased pressure to block the first orifice and the open passage and generate a damping force only in the rebound passage, and
 in the high-frequency mode, a damping force is generated in only the open passage that is opened.

5. The piston valve assembly for the shock absorber according to claim 1, wherein the guide assembly comprises:
 a first disk having a center through which the piston rod passes, an inner edge contacting a first seat portion formed around the piston rod along an inner edge of the first pressure chamber of the pressure valve, and an outer edge tightly contacting an outside of an outer edge of the first pressure chamber, wherein the first disk is elastically deformed according to an amount of a compressed fluid introduced from the bypass passage to the first pressure chamber through the first orifice that is formed in the first seat portion to communicate with the first pressure chamber;
 a second disk having a center through which the piston rod passes, wherein the second disk has the same shape as the first disk and is disposed to be spaced apart below the first disk, and interlocks with the elastic deformation of the first disk;
 a first spacer having a center through which the piston rod passes, wherein the first spacer is mounted between the first disk and the second disk such that the first and second disk are spaced apart from each other by a predetermined distance;
 a second spacer having a center through which the piston rod passes, wherein the second spacer is mounted between the second disk and the lower disk assembly such that the second disk and the lower disk assembly are spaced apart from each other by a predetermined distance;
 a ring-shaped ring support piece having a thickness corresponding to the first spacer and having an inner edge fixed between outer edges of the first and second disks;
 a guide wall extending along an outer edge of the ring support piece and facing an outer periphery of the pressure valve; and
 an O-ring fitted into a ring-shaped mounting groove recessed along an outer periphery of the pressure valve and tightly supported to an inner periphery of the guide wall.

6. The piston valve assembly for the shock absorber according to claim 1, wherein the lower retainer further comprises:
 a first seat portion provided around the piston rod and having a ring shape protruding to be stepped from a center of the lower retainer; and
 a second seat portion having a ring shape protruding to be stepped from an outer edge of the lower retainer, and
 the second pressure chamber communicating with the bypass passage is formed between a bottom outer edge of the lower disk assembly and the first and second seat portions.

7. A piston valve assembly for a shock absorber, comprising:
 a piston rod reciprocating within a cylinder;
 a main piston mounted on the piston rod to partition the cylinder into upper and lower chambers, wherein a plurality of compression passages and a plurality of rebound passages pass through the main piston in a vertical direction;
 a pressure valve mounted on the piston rod and disposed below the main piston, wherein a first pressure chamber having a ring shape around the piston rod is formed in a bottom surface of the pressure valve and an inlet hole is formed in an upper portion of the first pressure chamber;

a disk installed on the inlet hole so as to prevent a continuous increase in a pressure of the first pressure chamber;

a lower retainer mounted on the piston rod and disposed below the pressure valve, wherein a top surface of the lower retainer is opened;

a plurality of bypass passages formed on an outer periphery of the piston rod from an upper side of the main piston to an upper side of the lower retainer along a vertical length direction;

a guide assembly mounted on the piston rod and disposed between the pressure valve and the lower retainer to surround an outer periphery of the pressure valve and a bottom surface of the pressure valve, wherein the guide assembly tightly contacts the bottom surface of the pressure valve in a high-frequency mode and moves down toward the lower retainer in a low-frequency mode; and a lower disk assembly mounted on the piston rod and disposed between the guide assembly and the lower retainer, wherein the lower disk assembly forms a second pressure chamber in the lower retainer while covering the opened top surface of the lower retainer, forms an open passage communicating the second pressure chamber with the lower chamber in the high-frequency mode, and blocks the communication between the second pressure chamber and the lower chamber in the low-frequency mode due to the downward movement of the guide assembly, wherein the disk is installed in the piston rod, with a spacer being disposed therebetween.

* * * * *